(12) United States Patent
Weber et al.

(10) Patent No.: US 11,580,798 B2
(45) Date of Patent: Feb. 14, 2023

(54) VEHICLE LIGHTING SYSTEM

(71) Applicant: NISSAN NORTH AMERICA, INC., Franklin, TN (US)

(72) Inventors: William J Weber, Brighton, MI (US); Matthew Cole, Franklin, TN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/004,999

(22) Filed: Aug. 27, 2020

(65) Prior Publication Data
US 2022/0068056 A1 Mar. 3, 2022

(51) Int. Cl.
*G07C 5/08* (2006.01)
*B60Q 1/50* (2006.01)

(52) U.S. Cl.
CPC ............ *G07C 5/0825* (2013.01); *B60Q 1/50* (2013.01); *B60Q 2400/20* (2013.01); *B60Q 2400/40* (2013.01)

(58) Field of Classification Search
CPC ........ Y02T 10/70; B60L 2250/16; B60Q 1/50
USPC ....................................................... 340/461
See application file for complete search history.

(56) References Cited

U.S. PATENT DOCUMENTS

| | | | |
|---|---|---|---|
| 8,235,568 B2 | 8/2012 | Heiden et al. | |
| 8,742,907 B2 | 6/2014 | Matsumoto et al. | |
| 9,340,119 B2 | 5/2016 | Chen et al. | |
| 2011/0211362 A1* | 9/2011 | Heiden | B60Q 1/24 362/520 |
| 2012/0133282 A1 | 5/2012 | Rubio et al. | |
| 2015/0314697 A1 | 11/2015 | Chen et al. | |
| 2016/0068076 A1* | 3/2016 | Seo | B60R 25/1018 701/22 |
| 2017/0028795 A1* | 2/2017 | Schlaupitz | B60Q 1/50 |
| 2017/0088047 A1* | 3/2017 | Parvaresh | B60Q 1/2615 |
| 2018/0300965 A1* | 10/2018 | Mori | G07C 5/004 |
| 2019/0232795 A1 | 8/2019 | Zendler et al. | |

OTHER PUBLICATIONS

U.S. Appl. No. 16/540,399; Vehicle Light Assembly; W Weber; filed Aug. 14, 2019.

* cited by examiner

*Primary Examiner* — Fabricio R Murillo Garcia
(74) *Attorney, Agent, or Firm* — Global IP Counselors, LLP (57) ABSTRACT

A vehicle lighting system includes a light assembly and an electronic controller. The light assembly includes one or more lights configured to illuminate an external area that is in a vicinity of the vehicle. The electronic controller is programmed to receive a battery status signal from a battery of the vehicle. The electronic controller is further programmed to control the light assembly to illuminate the one or more lights to display a status of the battery when the vehicle is in a predetermined condition. The predetermined condition is at least one of a condition in which a remote electronic device is within a vicinity of the vehicle, a condition in which the vehicle has transitioned from a locked state to an unlocked state, and a condition in which the vehicle is about to be transitioned from the locked state to the unlocked state.

11 Claims, 5 Drawing Sheets

VEHICLE LIGHTING SYSTEM

BACKGROUND

Field of the Invention

The present invention generally relates to a vehicle lighting system. More specifically, the present invention relates to a vehicle lighting system that is part of a welcome light system of the vehicle.

Background Information

Vehicles can be equipped with welcome lights that include interior and exterior lights of a vehicle. For example, interior map lights are welcome lights that illuminate upon the vehicle has been unlocked or about to be unlocked. Additionally, vehicles can include exterior lights that illuminate when the vehicle is unlocked or about to be unlocked. Exterior lights can illuminate external areas that are in the vicinity of the vehicle. Exterior lights can include image projectors that project images such as the vehicle's logo, emblem and or condition of the vehicle or the vehicle's electronic components.

SUMMARY

In view of the state of the known technology, one aspect of the present disclosure is to provide a vehicle lighting system comprises a light assembly and an electronic controller. The light assembly includes one or more lights configured to illuminate an external area that is in a vicinity of the vehicle. The electronic controller is programmed to receive a battery status signal from a battery of the vehicle. The electronic controller is further programmed to control the light assembly to illuminate the one or more lights to display a status of the battery when the vehicle is in a predetermined condition. The predetermined condition is at least one of a condition in which a remote electronic device is within a vicinity of the vehicle, a condition in which the vehicle has transitioned from a locked state to an unlocked state, and a condition in which the vehicle is about to be transitioned from the locked state to the unlocked state.

In view of the state of the known technology, another aspect of the present disclosure is to provide a state-of-charge display system comprises a vehicle battery, a welcome light module and an electronic controller. The welcome light module has a welcome light assembly. The electronic controller is programmed to receive a battery status signal from the battery. The electronic controller is further programmed to control the light assembly to illuminate to display a status of the battery.

In view of the state of the known technology, another aspect of the present disclosure is to provide a vehicle having a state-of-charge display system. The vehicle comprises a vehicle battery, a vehicle body component, a vehicle lighting system and an electronic controller. The vehicle lighting system has a welcome light assembly installed to the vehicle body component and is integrated with a welcome light module of the vehicle. The electronic controller is programmed to receive a battery status signal from the vehicle battery. The electronic controller is further programmed to control the welcome light assembly to illuminate to display a status of the battery when the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
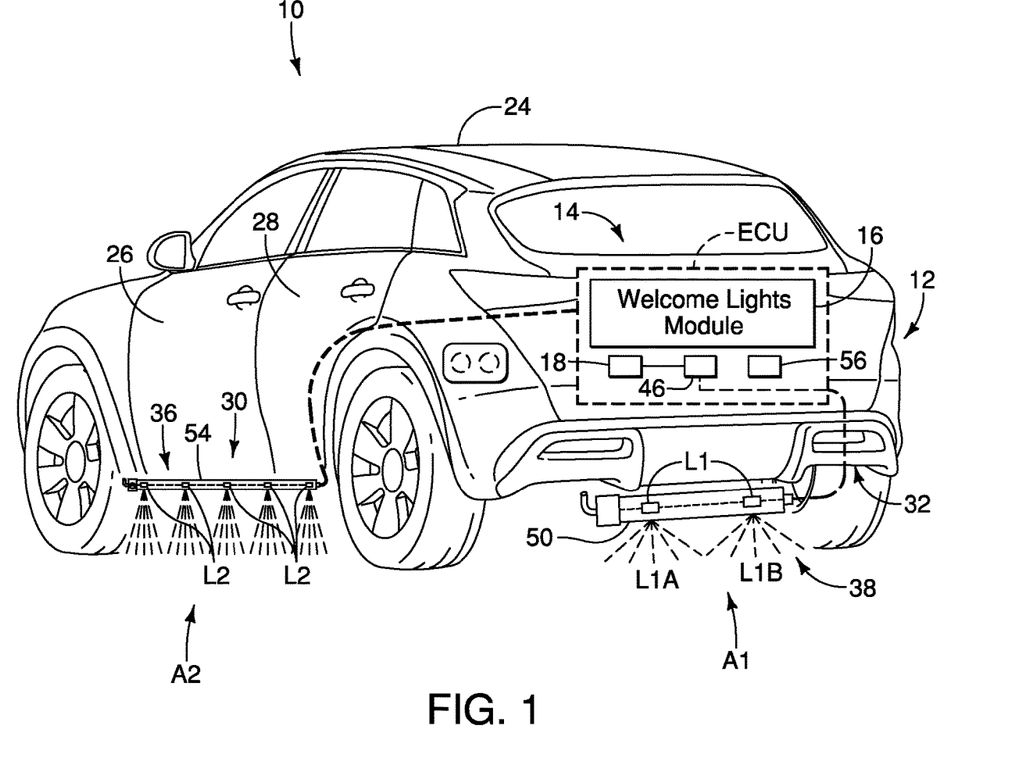
FIG. 1 is a rear perspective view of a vehicle equipped with a vehicle lighting system in accordance with an illustrated embodiment.

Referring initially to FIG. 1, a vehicle 10 is equipped with a state-of-charge (SoC) display system 12 in accordance with an illustrated embodiment. The vehicle 10 of the illustrated embodiment can be an all-electric or hybrid vehicle. While the vehicle 10 is illustrated as a sports utility vehicle, it will be apparent to those skilled in the vehicle field that the vehicle 10 can take the form of an all-electric or hybrid automobile, sedan, truck, cart, track propelled vehicle, boat, or drone, etc. The vehicle 10 of the illustrated embodiment comprises a vehicle lighting system 14 that is part of the SoC display system 12. The vehicle lighting system 14 of the illustrated embodiment is integrated with a welcome light module 16 of the vehicle 10, as will be further described below. Therefore, the vehicle lighting system 14 are considered welcome lights or a welcome light assembly of the vehicle 10.

As seen in FIG. 1, the vehicle 10 comprises a battery 18 that powers the vehicle 10 and the electronic components of the vehicle 10. The "battery" 18 as described herein can refer to a battery pack including multiple secondary battery cells suitable for providing power for propelling the vehicle 10. That is to say, the battery 18 can be implemented as a high voltage battery pack including multiple nickel-metal hydride (NiMH), molten-salt, or lithium-ion battery cells, for example, and capable of generating hundreds of volts. The vehicle 10 includes one or more SoC detector(s) 20 for measuring or detecting the SoC of the battery 18, such as an amp-hour meter, a voltage meter, etc. In particular, the battery 18 can be equipped with the SoC detector(s) 20. The SoC detector(s) 20 are also part of the SoC display system 12 of the vehicle 10. In the illustrated embodiment, the SoC display system 12 comprises the vehicle battery 18 as well as the welcome light module 16 that has the lighting system 14.

The vehicle 10 further includes a charging system 22 for charging the battery 18. For example, the charging system 22 includes outdoor plug sockets for receiving charge from an exterior source. It will be apparent to those skilled in the vehicle field from this disclosure that the charging system 22 can additionally include a distribution board, a control panel, indoor plug sockets, and a solar panel. The vehicle 10 draws commercial electric power (AC electric power) via the charging system 22, which is supplied to the distribution board.

Figure 2:
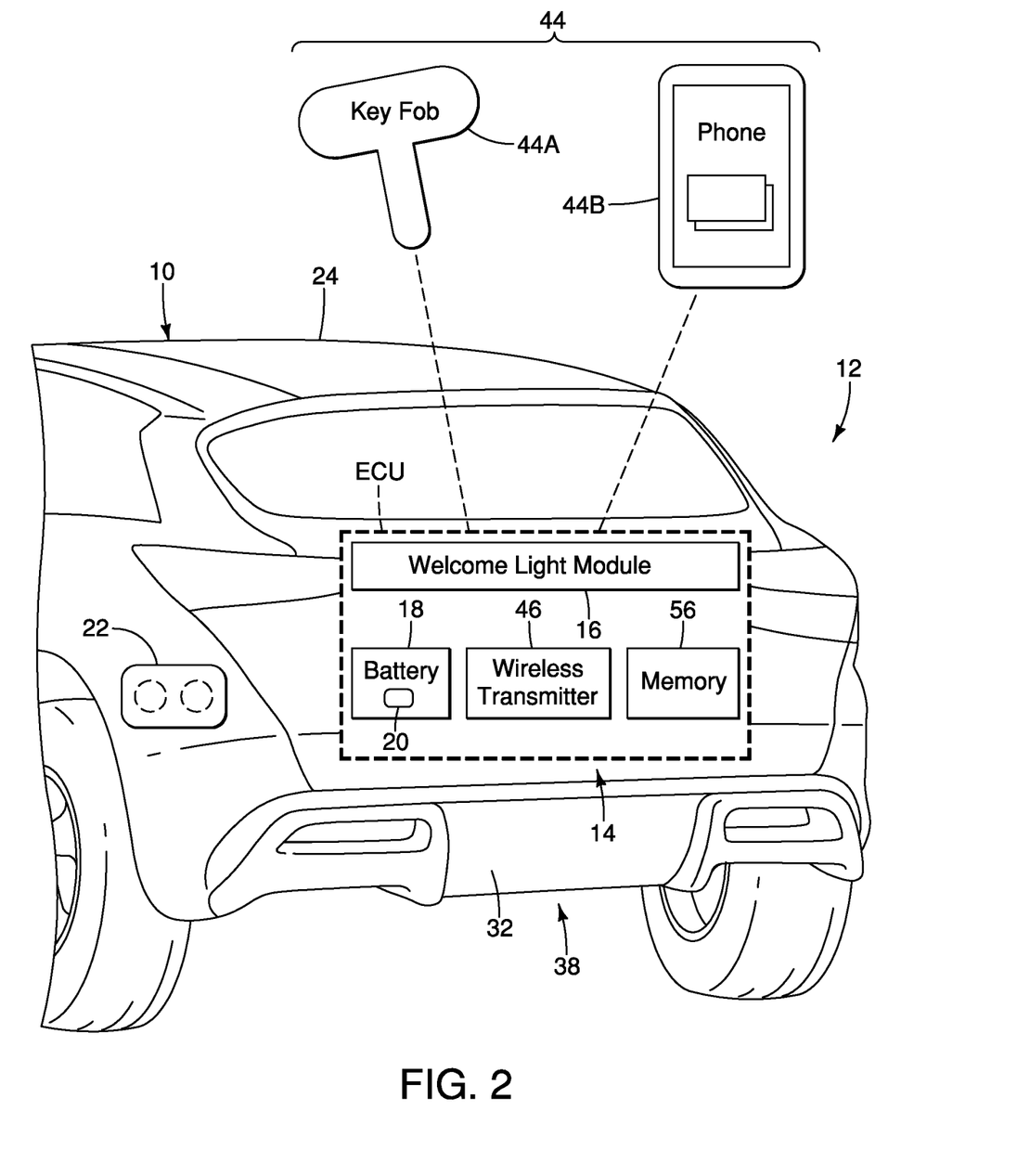
FIG. 2 is an enlarged view of the vehicle of FIG. 1 and further equipped with remote electronic devices to be used with the vehicle lighting system.

As best seen in FIG. 2, the vehicle 10 includes a vehicle body 24, a front door 26 (illustrated as driver's side) and a rear door 28 (illustrated as driver's side) that are supported to a sill 30, such as a rocker panel and a rocker panel trim. The vehicle body 24 further defines part of the vehicle's 10 rear to which a rear body component 32 is supported. In the illustrated embodiment, the rear body component 32 refers to all vehicle body 24 components that define a rear body structure of the vehicle 10, such as the rear fascia, the rear underside area or the bumper of the vehicle 10. In the illustrated embodiment, the sill 30 and the rear body component 32 are also both considered vehicle body components of the vehicle 10 that at least partially defines an underbody 34 of the vehicle 10. The underbody 34 defines an outer perimeter of the vehicle 10. In the illustrated embodiment, as seen in FIG. 2, the vehicle 10 is equipped with a side light assembly 36 and a SoC light assembly 38 that are both part of the vehicle lighting system 14 of the illustrated embodiment.

Therefore, the side light assembly 36 and the SoC light assembly 38 are controlled by the welcome light module 16 of the vehicle 10 so that the lighting system 14 illuminates as welcome lights for the vehicle's 10 rider(s), as will be further discussed below. The components of the lighting system 14 is made and configured for quick and easy installation to the vehicle 10 as needed and/or desired. The lighting system 14 can also be sold as an aftermarket accessory that is subsequently installed to the vehicle 10 at the purchaser's wishes. Referring to FIG. 2, the lighting system 14 includes the side light assembly 36 (e.g., side welcome lights) and the SoC light assembly 38 (e.g., rear welcome lights). The side light assembly 36 is illustrated for example as being disposed on the driver's side of the vehicle 10. It will be apparent to those skilled in the vehicle field from this disclosure that the side light assembly 36 are illustrated as being welcome lights only as an example and that the vehicle 10 can be equipped with other types of welcome lights such as welcome lights at the vehicle's 10 sideview mirrors.

Figure 3:
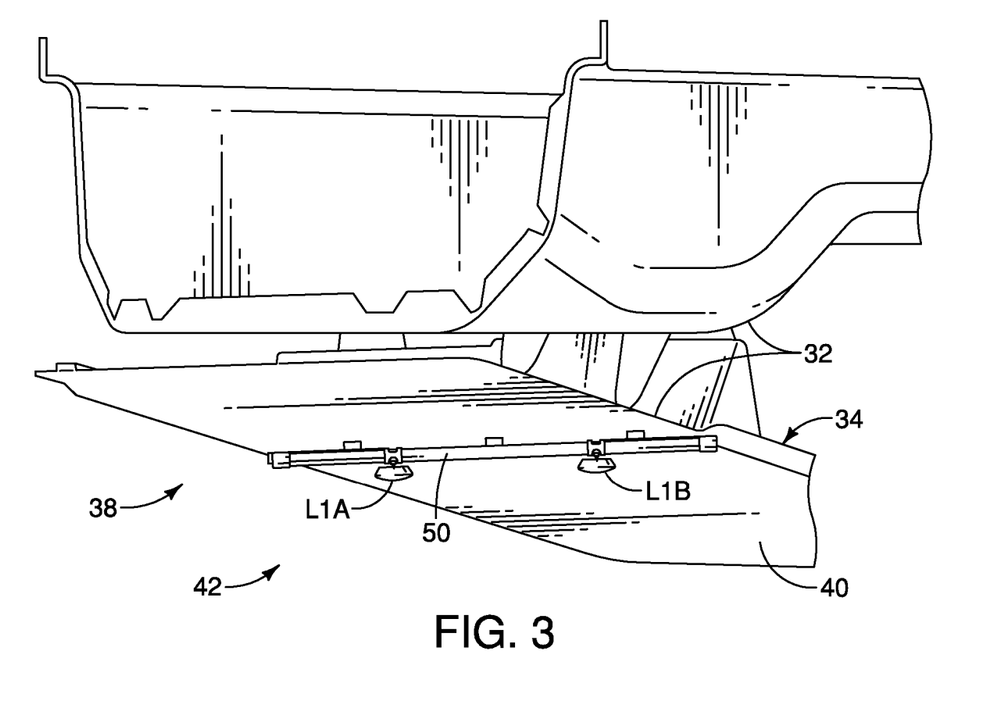
FIG. 3 is a view of a state-of-charge lighting assembly of the vehicle lighting system.
Figure 4:
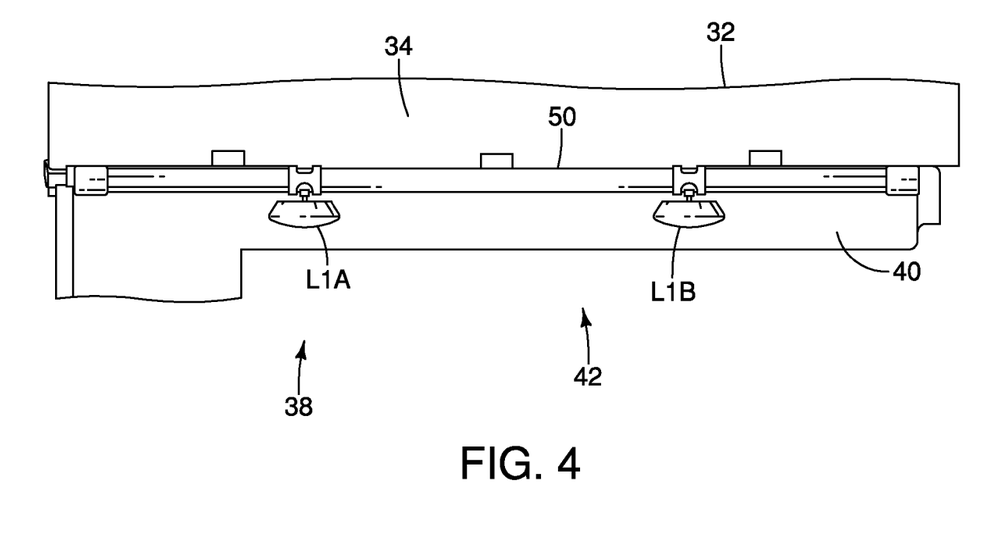
FIG. 4 is an enlarged view of the state-of-charge lighting assembly showing the light sources.

As best seen in FIGS. 2 to 4, the SoC light assembly 38 of the lighting system 14 functions as an SoC indicator or display to display an SoC of the vehicle's 10 battery 18. The SoC light assembly 38 is supported to the vehicle body 24 on the vehicle 10. In particular, as shown in FIG. 3, the SoC light assembly 38 is supported to the rear body component 32 of the vehicle 10, as will be further discussed below. Particularly, the SoC light assembly 38 of the illustrated embodiment, is supported to the underbody 34 or undershield 40 of the vehicle 10 that is part of the rear body component 32.

Alternatively speaking, the rear body component 32 is installed onto the underbody 34 of the vehicle 10. In particular, the SoC light assembly 38 is mounted between the rear fascia and the undershield 40 of the vehicle 10. As a result, the SoC light assembly 38 illuminates an area exterior of the vehicle 10 from a rear underside area 42 of the vehicle 10. In the illustrated embodiment, the SoC display system 12 of the vehicle lighting system 14 is a welcome light assembly (e.g., the SoC light assembly 38) that is controlled by the welcome light module 16. It will be apparent to those skilled in the vehicle field from this disclosure that the while the SoC light assembly 38 is illustrated as being disposed at the vehicle's 10 rear end, the SoC light assembly 38 can alternatively be mounted to other parts of the vehicle, such as the vehicle's front end or to a vehicle body component near the vehicle's front end.

In the illustrated embodiment, as best seen in FIG. 2, the side light assembly 36 is supported to the sill 30. For example, the side light assembly 36 can be positioned between the rocker panel trim and the rocker panel that define the sill 30. The side light assembly 36 projects light from the sill 30 towards an illuminated area that is exterior of the vehicle 10 (e.g., an exterior area). While only a single side light assembly 36 is illustrated as projecting light from the driver's side of the vehicle 10, it will be apparent to those skilled in the vehicle field from this disclosure that the vehicle 10 can be similarly equipped with an additional side light assembly for the passenger's side of the vehicle 10 of the illustrated embodiment. The side light assembly 36 operates to illuminate the exterior area that is the vicinity of the vehicle sill 30. Therefore, the side light assembly 36 of the illustrated embodiment is mounted at the underbody 34 of the vehicle 10 for illuminating the exterior area in the vicinity of the vehicle 10.

Thus, the SoC light assembly 38 and the side light assembly 36 of the illustrated embodiment can both be considered part of the vehicle's 10 underglow light assembly or ground effects that is attached to the underbody 34 or beneath the chassis of the vehicle 10, The lighting system 14 is oriented and/or constructed to illuminate the illuminated area(s) either alone or in combination with the vehicle's 10 exterior lights (e.g., taillights or parking lights). Therefore, the lighting system 14 of the illustrated embodiment is configured to illuminate a first exterior area A1 and a second exterior area A2 from an underbody 34 of the vehicle 10.

In particular, as seen in FIG. 2, the SoC light assembly 38 illuminates a rear exterior area (e.g., the first exterior area A1) that extends rearward of the vehicle body 24 and the side light assembly 36 illuminates a side exterior area (e.g., the second exterior area A2) that extends laterally outwards of the sill 30. The first and second exterior areas A1 and A2 are located beneath the underbody 34 and also the vicinity of the outer perimeter of the vehicle 10. The first and second exterior areas A1 and A2 can extend along the longitudinal sides and the rear lateral side of the vehicle 10 and can encompass the area located directly beneath underbody 34, the area located inboard of the perimeter and the area located outboard of the perimeter that are in the vicinity of the perimeter.

While the first and second exterior areas A1 and A2 are illustrated as being projected near the driver's side of the vehicle 10 and the rear side of the vehicle 10, it will be apparent to those skilled in the vehicle field from this disclosure that the lighting system 14 can be implemented with the passenger's side to illuminate the ground in the vicinity of the passenger's side. It will be further apparent to those skilled in the vehicle field from this disclosure that the lighting system 14 can illuminate different exterior areas that are in the vicinity of the vehicle 10 as needed and/or desired. It will be additionally apparent to those skilled in the vehicle field from this disclosure that the lighting system 14 can be implemented to illuminate the illuminated area by itself or in combination with other exterior lights of the vehicle 10 (e.g., parking lights, brake lights, etc.).

As stated, the lighting system 14 is integrated with the welcome light module 16 of the vehicle. That is, the lighting system 14 of the illustrated embodiment is configured to illuminate in response to a predetermined condition of the vehicle 10 that signifies that the vehicle's 10 rider is approaching the vehicle 10. Therefore, the lighting system 14 functions as welcome lights for the vehicle 10 that illuminate prior to the rider entering the vehicle 10. Thus, the predetermined condition for illuminating the lighting system 14 includes at least one of a condition in which a remote electronic device 44 is within a vicinity (e.g., 20 feet) of the vehicle 10, a condition in which the vehicle 10 has transitioned from a locked state to an unlocked state, and a condition in which the vehicle 10 is about to be transitioned from the locked state to the unlocked state. The welcome light module 16 will be further discussed below.

As seen in FIGS. 1 and 2, the lighting system 14 preferably further includes a wireless transmitter 46 or a wireless communication device such as a receiver, a transmitter, a transceiver, a transmitter-receiver, and any device or devices, separate or combined, capable of transmitting and/or receiving wireless communication signals. The wireless transmitter 46 is in communication with the remote electronic devices 44 and the battery 18 to receive activation signals from the remote electronic devices 44 and the battery 18. The wireless transmitter 46 can be implemented with the welcome light module 16 and/or the SoC light assembly 38.

In the illustrated embodiment, the SoC light assembly 38 and the side light assembly 36 are configured to illuminate in concert as part of the welcome light module 16. That is, the welcome light module 16 controls the SoC light assembly 38 and the side light assembly 36 to illuminate the first and second exterior areas A1 and A2 simultaneously when the vehicle 10 is in the predetermined condition. The vehicle 10 is equipped with one or more wire harnesses that are schematically shown in FIG. 2. The wire harnesses electrically connect the SoC light assembly 38 and the side light assembly 36 so that they illuminate in concert. Thus, in the illustrated embodiment, the side welcome lights (e.g., the side light assembly 36) and the rear welcome lights (e.g., SoC light assembly 38) are configured to illuminate simultaneously or in concert when the vehicle 10 is in the predetermined condition.

Figure 5:
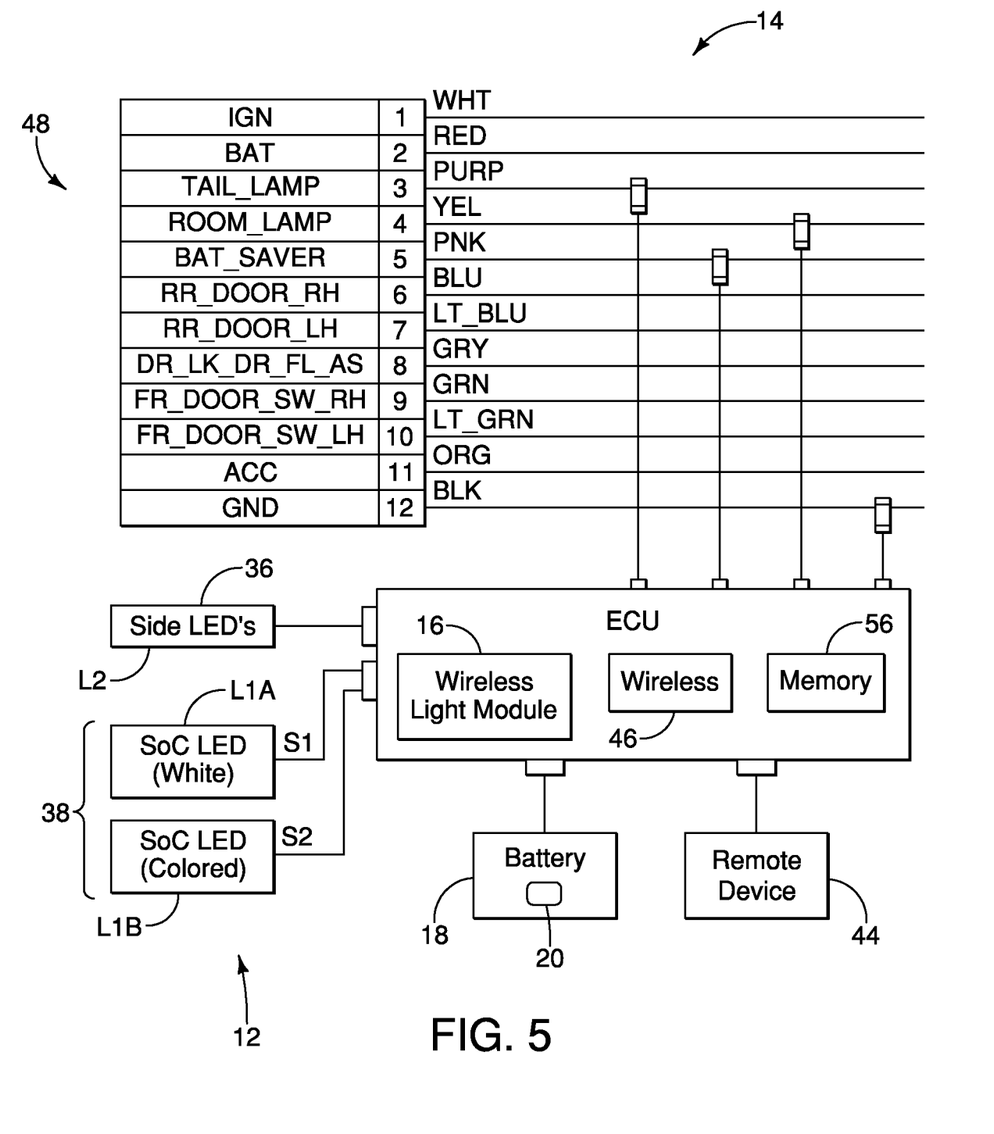
FIG. 5 is a schematic view of the vehicle lighting system of the illustrated embodiment.
Figure 6:
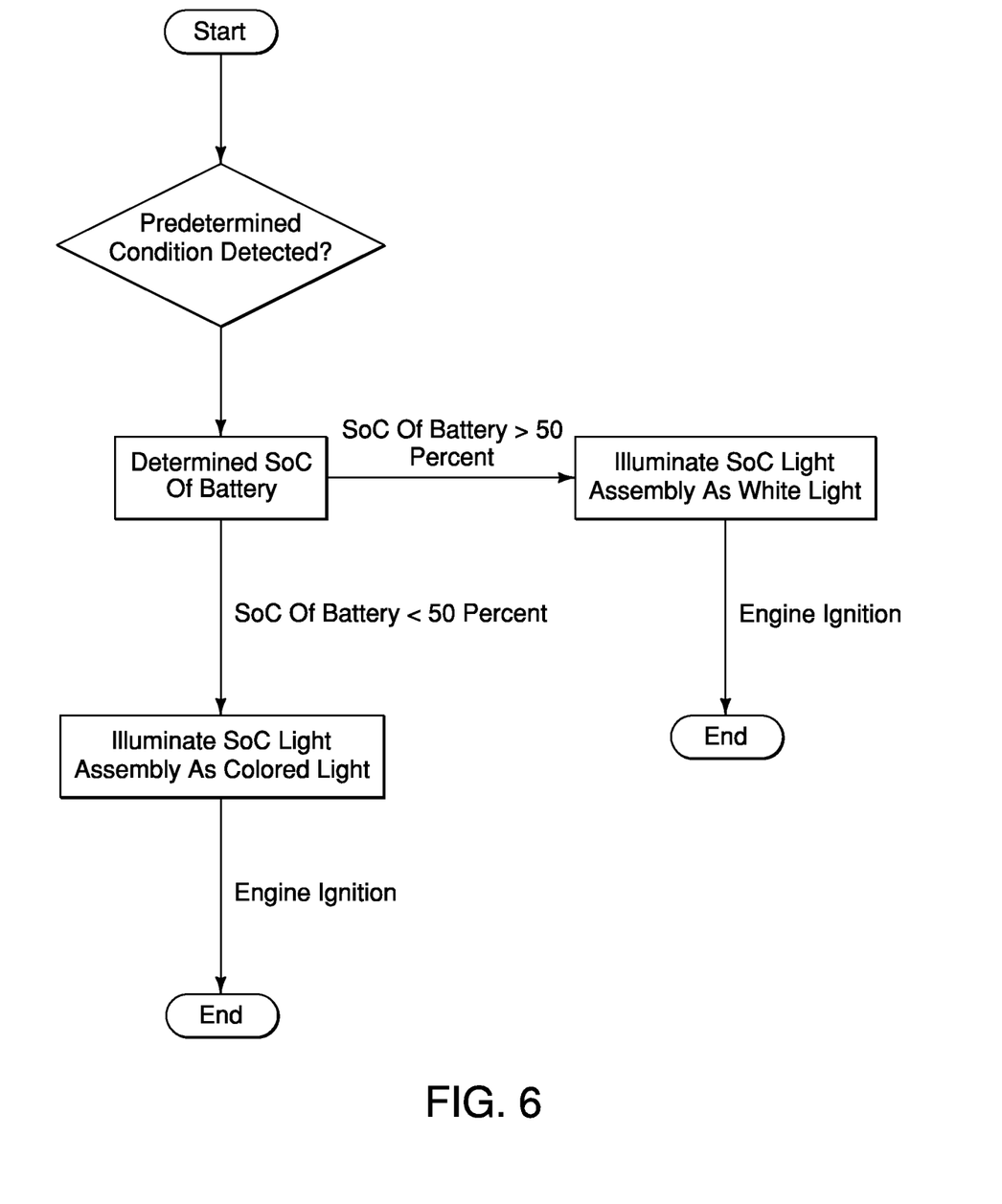
FIG. 6 is a flowchart of a decision-making process for controlling the vehicle lighting system.

The vehicle lighting system 14 draws electrical power for operating the vehicle light system from the electrical system for the vehicle 10. For example, the light assembly is electrically connected to the welcome light module 16 of the vehicle 10 that powers the light assembly with electrical power from the vehicle's 10 electrical system. In the illustrated embodiment, as seen in FIG. 5, the light system 12 further comprises interior map lights 48 that can be controlled by the welcome light module 16. The interior map lights 48 are also welcome lights configured to illuminate upon detecting an activation signal that signifies that the vehicle 10 is in the predetermined condition.

Referring to FIG. 1, the SoC display system 12 can include one or more remote electronic devices 44 that can be provided to the vehicle 10. The remote electronic devices 44 can include one or more of a wireless key fob 44A that locks an unlocks the vehicle and a personal mobile device 44B. The remote electronic devices 44 are capable of wireless communication with motor vehicle 100 to remotely lock and/or unlock the vehicle. For example, the remote electronic devices 44 are capable of transmitting radio frequency ("RF") signals or other types of signals could be used. The remote electronic devices 44, particularly the personal mobile device 44B, can optionally include an SoC control application for monitoring the SoC of the vehicle's battery 18.

Referring to FIGS. 2 and 4, the SoC light assembly 38 has a fixed structure that includes a light bar 50 and one or more light sources L1. As shown, the light 50 bar is an elongated member. The LEDs L1 are distributed along the longitudinal length of the light bar 50. The light bar 50 can be fastened to the rear body component 32 by any suitable means, such as by adhesive, tape, fastener(s), clip(s), clamp(s) or via snap-fit connection(s). In the illustrated embodiment, the light bar 50 is fastened to the rear body component 32 via a clamp.

As best seen in FIGS. 1 and 2, the light bar 50 is configured to illuminate the first exterior area A1 that is in the vicinity of the vehicle 10. The light bar 50 is configured to be assembled to the rear body component 32. In other words, the light bar 50 is configured to be assembled to a vehicle body component of the vehicle 10. Therefore, the welcome light assembly includes one or more lights L1 configured to illuminate an external area (e.g., the first exterior area A1) that is in a vicinity of the vehicle 10.

The light sources L1 are light projectors, preferably long-life light emitting diodes (LEDs) disposed on the light bar. The light sources L1 are preferably shielded in their housing by rubber isolators (not shown) designed to reduce vibrations and will improve component life. Therefore, the light bar 50 includes at least one light L1 that is preferably an LED L1. The one or more lights L1 of the SoC light assembly 38 includes a plurality of LEDs L1. Therefore, the welcome light assembly includes a plurality of LEDs L1. The LEDs L1 can be surface-mount LEDs configured to emit light with any of a variety of colors, color temperatures or other properties.

The light bar 50 can also be configured to function as an auxiliary mounting component for the SoC light assembly 38. For example, the light bar 50 can emit and/or distribute light produced by the LEDs L1 of the SoC light assembly 38. The light bar 50 can also include features for effecting a light distribution of the SoC light assembly 38. For example, the light bar 50 can be configured to distribute the light produced by the LEDs L1 and projected towards the first exterior area A1. For example, the light bar 50 can include one or more angled facet(s) that can distribute light produced by the LEDs L1 at different desired angles. Additionally, the light bar 50 can include reflective material to deflect light across the underbody 34 and around the outer perimeter of the vehicle 10.

Similarly, as seen in FIG. 2, the side light assembly 36 includes a light bar 54 that is a fixed structure fixed to the sill 30 and a plurality of LEDs L2 that are supported to the light bar 54. It will be apparent to those skilled in the vehicle field from this disclosure that the side light assembly 36 can have the structure and configuration similar to that disclosed for the SoC light assembly 38 but being disposed at the vehicle's 10 sill. Additionally, it will be apparent to those skilled in the vehicle field from this disclosure that the side light assembly 36 can have structures and configuration of other welcome light assemblies, for example the light assemblies as disclosed in U.S. Pat. No. 8,235,568 and U.S. patent application Ser. No. 16/540,399.

In the illustrated embodiment, while the light bar 50 of the SoC light assembly 38 is illustrated as having two LEDs L1A and L1B distributed along the light bar 50, it will be apparent to those skilled in the vehicle field from this disclosure that the number and spacing of the LEDs L1A and L1B of the SoC light assembly 38 can vary as needed and/or desired. In the illustrated embodiment, the LEDs L1A and L1B of the SoC light assembly 38 are configured to change color and/or intensity based on the detected SoC of the battery 18. The plurality of light LEDs L1A and L1B are configured to emit a plurality of display colors based on the battery status signal from the battery 18. Therefore, the LEDs L1A and L1B of the vehicle lighting system 14 can illuminate different colors based on the SoC of the battery 18, as will be discussed below.

The SoC display system 12 comprises an electronic controller (ECU) programmed to receive a battery status signal from the vehicle battery 18. The ECU is programmed to receive a battery status signal from the battery 18. The ECU is further programmed to receive activation signals from the SoC detector(s) 20 via the wireless transmitter 46 as seen in FIG. 5. The ECU is programmed to control the welcome light assembly to illuminate to display a status of the battery 18 when the vehicle 10 is in the predetermined condition. In particular, the ECU is programmed to control the SoC light assembly 38 to illuminate the one or more lights to display a status of the battery 18 when the vehicle 10 is in the predetermined condition.

Referring to FIG. 8, the ECU electrically controls the components of the SoC light assembly 38 and the side light assembly 36. Specifically, the ECU electrically controls the LEDs L1 and the LED L2. As illustrated, the ECU is part of the vehicle lighting system 14. The ECU preferably includes a microcomputer that includes one or more processor(s) and one or more storage device(s) (i.e., a computer memory device). The memory 56 is any computer storage device or any computer readable medium with the sole exception of a transitory, propagating signal. For example, the memory 56 can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM (Random Access Memory) device, a hard disk, a flash drive, etc. The storage device is configured to store settings, programs, data, calculations and/or results of the processor(s).

In the illustrated embodiment, the memory 56 of the ECU stores predetermined SoC thresholds of the battery 18. In particular, the memory 56 can include a range of predetermined charges of the battery 18 so that the SoC light assembly 38 is controlled in accordance to the predetermined charges that are stored in the memory 56. For example, the ECU can set the predetermined charge that is a threshold charge at 50 percent of the total charge of the battery 18. The memory 56 also stores a quantity of electric power that reflects that the battery 18 is fully charged. The microprocessor of the ECU can compute a difference between a detected SoC of the battery 18 and the quantity of the electric power of the fully charged battery 18, and compare the computed difference to the predetermined charge (e.g., 50 percent charge) that is stored the memory in order to control the SoC light assembly 38 accordingly.

Therefore, the ECU can control the SoC light assembly 38 to display a first color when the detected SoC is less than 50 percent charge. The ECU can control the SoC light assembly 38 to display a second color that is different from the first color when the detected SoC is 50 percent or greater of the total charge of the battery 18. It will be apparent to those skilled in the vehicle field from this disclosure that the predetermined charge (e.g., the threshold charge) is described as being 50 percent of the fully charged battery 18 level for the purposes of being an example only. The SoC display system 12 can have a range of predetermined charges that are stored in the memory and the ECU can control the SoC light assembly 38 in accordance with a variety of predetermined charges as necessary and/or desired.

As seen in FIG. 1, the ECU is electrically connected to the light bar 50 of the SoC light assembly 38 and the light bar 54 of the side light assembly 36. The ECU provides electrical power to both the light bars 50 and 54 in order to illuminate the plurality of LEDs L1 and L2. Therefore, the ECU is electrically connected to and electrically operates the LEDs L1 and L2 of the light bars 50 and 54. In the illustrated embodiment, the ECU operates with the welcome light module 16 that operates interior map lights 48 and the other welcome lights of the vehicle 10. As shown in FIG. 5, the interior map lights 48 can include front door switch lights, rear door switch lights, the interior room lamp, as well as dashboard lights that can indicate various statuses of the vehicle's 10 electronic components such as the battery 18, etc.

Preferably, the ECU is also configured to provide electrical power to the light bars in concert with the interior map lights 48 of the vehicle 10. Additionally, the LEDs L1 of the SoC light assembly 38 and the LEDs L2 of the side light assembly 36 preferably activate at the same time as the interior map lights 48 such that the first and second exterior areas A1 and A2 are illuminated when the interior map lights 48 turn ON.

As seen in FIGS. 4 and 5, once the interior map light 48 comes ON (controlled via the welcome light module 16 of the vehicle 10), the ECU controls the light bars to activate the LEDs L1 and L2. As stated, the power for the lighting system 14 is supplied by the welcome light module 16. The power from the welcome light module 16 provides power to both sets of the LEDs L1 and L2 in parallel so they come ON in concert or at the same time. Preferably, the LEDs L1 and L2 of the light assembly are configured to turn OFF along with the interior map lights 48 after a predetermined time period. Alternatively, the LEDs L1 and L2 of the light assembly and the interior map lights 48 can turn OFF automatically in concert when the ignition is turned ON. As stated, in the illustrated embodiment, the LEDs L1 and L2 of the lighting system 14 and the interior map lights 48 are considered welcome lights. In other words, the LEDs L1 and L2 of the light bars 50 and 54 are welcome lights that are configured to illuminate upon when the vehicle 10 is in the predetermined condition.

As stated, in the illustrated embodiment, the predetermined condition can be a condition in which the vehicle 10 has transitioned from a locked state to an unlocked state. For example, in the event that the driver unlocks the vehicle 10 via any one of the remote electronic devices 44 (e.g., the key fob 44A), the wireless transmitter 46 receives a signal from the key fob 44A to unlock the vehicle 10. The wireless transmitter 46 can transmit the activation signal to the ECU's microprocessor, which thereafter activates the LEDs L1 and L2 of the vehicle lighting system 14. The predetermined condition can also be a condition in which the vehicle 10 is about to be transitioned from the locked state to the unlocked state. For example, the vehicle 10 can be provided with an activation sensor that can sense the presence of the key fob 44A in the vicinity. That is, the activation sensor can detect that the vehicle 10 is about to be transitioned from the locked state to the unlocked state. In this circumstance, the activation sensor can transmit the activation signal to the ECU, which thereafter activates the LEDs L1 and L2 of the vehicle lighting system 14.

As stated, the LEDs L1A and L1B of the SoC light assembly 38 can display different colors based on the detected SoC of the battery 18. In particular, the ECU is configured to send a first battery status signal to the light assembly when the SoC of the battery 18 is less than a predetermined charge (e.g., 50 percent charge) so that the SoC light assembly 38 displays the first color. The ECU is configured to send a second battery status signal to the SoC light assembly 38 when the SoC of the battery 18 is greater than or equal to the predetermined charge (e.g., 50 percent charge) so that the SoC light assembly 38 displays the second color. Therefore, the SoC light assembly 38 is configured to display the first color (e.g., colored light) in response to the first battery status signal S1, and the second color (e.g., white light) in response to the second battery status signal S2.

For example, one of the LEDs L1A of the SoC light assembly 38 can be configured to display white light when illuminated. The other one of the LEDs L1B of the SoC light assembly 38 can be configured to display colored light when illuminated. The ECU can be configured to control illumination between the LEDs L1A and L1B of the SoC light assembly 38. Particularly, when the detected SoC is 50 percent or greater of maximum charge, the ECU can control the SoC light assembly 38 such that only the LED L1A is energized so that white light is displayed to indicate that the SoC is 50 percent or greater of maximum charge. When the detected SoC is less than 50 percent of the maximum charge, the ECU can control the SoC light assembly 38 such that only the LED L1B is energized so that colored light is displayed to indicate that the SoC is less than 50 percent of maximum charge. Therefore, the SoC light assembly 38 has a multi-color LED lamp defined by the light bar 50 and the LEDs L1. While the SoC light assembly 38 is described as having two LEDs L1A and L1B so that the SoC light assembly 38 is configured to illuminate two colors depending on SoC, it will be apparent to those skilled in the vehicle field from this disclosure that the SoC light assembly 38 can include additional LEDs that display a variety of light colors to reflect a spectrum of the SoC of the battery 18.

The ECU can alternatively control the voltages supplied to the LEDs L1 so that the LEDs L1 illuminate different intensity to reflect the SoC of the battery 18. It will be apparent to those skilled in the vehicle field from this disclosure that the ECU can control the SoC light assembly 38 such that the LEDs L1 display a variety of light colors and in a variety of intensities based on SoC of the battery 18 as needed and/or desired.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle lighting system. Accordingly, these terms, as utilized to describe the present invention should be interpreted relative to a vehicle equipped with the vehicle lighting system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle lighting system, comprising:
a light assembly including one or more lights configured to illuminate an external area that is in a vicinity of a vehicle having the light assembly installed thereon, the light assembly including a plurality of first light emitting diodes configured to illuminate a first exterior area that extends rearward of a vehicle, the light assembly including a plurality of second light emitting diodes configured to illuminate a second exterior area that is a side exterior area of the vehicle; and
an electronic controller programmed to receive a battery status signal from a battery of the vehicle, the electronic controller being further programmed to control the light assembly to illuminate the one or more lights to display a state-of-charge of the battery when the vehicle is in a predetermined condition, the electronic controller being programmed to control the light assembly to illuminate a first color when the state of charge of the battery is above a predetermined state of charge threshold, the electronic controller being programmed to control the light assembly to illuminate a second color when the state of charge of the battery is below the predetermined state of charge threshold, the first and second colors being different,
the predetermined condition meeting all of a condition in which a remote electronic device is within a vicinity of the vehicle, a condition in which the vehicle has transitioned from a locked state to an unlocked state, and a condition in which the vehicle is about to be transitioned from the locked state to the unlocked state.

2. The vehicle lighting system according to claim 1, wherein
the plurality of light emitting diodes are configured to emit a plurality of display colors based on the battery status signal from the battery.

3. The vehicle lighting system according to claim 1, wherein
the electronic controller is configured to send a first battery status signal to the light assembly when the state-of-charge of the battery is less than or equal to a predetermined charge, the electronic controller being configured to send a second battery status signal to the light assembly when the state-of-charge of the battery is greater than the predetermined charge,
the plurality of light emitting diodes being configured to display a first color of the plurality of display colors in response to the first battery status signal, and a second color of the plurality of display colors in response to the second battery status signal.

4. A state-of-charge display system, comprising a vehicle battery;
a welcome light module having a welcome light assembly, the welcome light assembly including a plurality of first light emitting diodes configured to illuminate a first exterior area that extends rearward of a vehicle, the welcome light assembly including a plurality of second light emitting diodes configured to illuminate a second exterior area that is a side exterior area of the vehicle; and
an electronic controller programmed to receive a battery status signal from the battery, the electronic controller being further programmed to control the light assembly to illuminate to display a state-of-charge of the battery, the electronic controller being programmed to control the light assembly to illuminate a first color when the state of charge of the battery is above a predetermined state of charge threshold, the electronic controller being programmed to control the light assembly to illuminate a second color when the state of charge of the battery is below the predetermined state of charge threshold, the first and second colors being different, the welcome light assembly is configured to illuminate the first and second exterior areas of the vehicle in response to receiving the battery status signal.

5. The state-of-charge display system according to claim 4, wherein
the plurality of light emitting diodes are configured to emit a plurality of display colors based on the battery status signal from the battery.

6. The state-of-charge display system according to claim 4, wherein
the electronic controller is configured to send a first battery status signal to the light assembly when the state-of-charge of the battery is less than or equal to a predetermined charge, the electronic controller being configured to send a second battery status signal to the light assembly when the state-of-charge of the battery is greater than the predetermined charge,
the plurality of first light emitting diodes being configured to display a first color of the plurality of display colors in response to the first battery status signal, and a second color of the plurality of display colors in response to the second battery status signal.

7. The state-of-charge display system according to claim 4, wherein
the electronic controller is programmed to control the welcome light module so that the welcome light assembly displays the state-of-charge of the battery when the vehicle is in a predetermined condition,
the predetermined condition being at least one of a condition in which a remote electronic device is within a vicinity of the vehicle, a condition in which the vehicle has transitioned from a locked state to an unlocked state, and a condition in which the vehicle is about to be transitioned from the locked state to the unlocked state.

8. A vehicle having a state-of-charge display system, the vehicle comprising:
a vehicle battery;
a vehicle body;
a vehicle lighting system having a welcome light assembly installed to the vehicle body and integrated with a welcome light module of the vehicle, the welcome light assembly including a plurality of first light emitting diodes configured to illuminate a first exterior area that extends rearward of the vehicle body, the welcome light assembly including a plurality of second light emitting diodes configured to illuminate a second exterior area that is a side exterior area of the vehicle body; and
an electronic controller programmed to receive a battery status signal from the vehicle battery, the electronic controller being further programmed to control the welcome light assembly to illuminate to display a state-of-charge of the battery, the electronic controller being programmed to control the light assembly to illuminate a first color when the state of charge of the battery is above a predetermined state of charge threshold, the electronic controller being programmed to control the light assembly to illuminate a second color when the state of charge of the battery is below the predetermined state of charge threshold, the first and second colors being different, the welcome light assembly is configured to illuminate the first and second exterior areas of the vehicle in response to receiving the battery status signal.

9. The vehicle according to claim 8, wherein
the plurality of first light emitting diodes are configured to emit a plurality of display colors based on the battery status signal from the battery.

10. The vehicle according to claim 9, wherein
the electronic controller is configured to send a first battery status signal to the welcome light assembly when the state-of-charge of the battery is less than or equal to a predetermined charge, the electronic controller being configured to send a second battery status signal to the light assembly when the state-of-charge of the battery is greater than the predetermined charge,
the welcome light assembly being configured to display a first color of the plurality of display colors in response to the first battery status signal, and a second color of the plurality of display colors in response to the second battery status signal.

11. The vehicle according to claim 8, wherein
the electronic controller programmed to control the welcome light module to display the status of the battery when the vehicle is in a predetermined condition,
the predetermined condition being at least one of a condition in which a remote electronic device is within a vicinity of the vehicle, a condition in which the vehicle has transitioned from a locked state to an unlocked state, and a condition in which the vehicle is about to be transitioned from the locked state to the unlocked state.

* * * * *